(12) United States Patent
Takahashi et al.

(10) Patent No.: US 7,817,362 B2
(45) Date of Patent: Oct. 19, 2010

(54) INSPECTION APPARATUS AND INSPECTION METHOD OF MAGNETIC DISK OR MAGNETIC HEAD

(75) Inventors: Masayoshi Takahashi, Yokohama (JP); Ritsuro Orihashi, Tokyo (JP); Wen Li, Yokohama (JP); Shinji Homma, Nakai (JP)

(73) Assignee: Hitachi, Ltd.

( * ) Notice: Subject to any disclaimer, the term of this patent is extended or adjusted under 35 U.S.C. 154(b) by 2403 days.

(21) Appl. No.: 10/347,387

(22) Filed: Jan. 21, 2003

(65) Prior Publication Data

US 2004/0078703 A1 Apr. 22, 2004

(30) Foreign Application Priority Data

Mar. 19, 2002 (JP) .............................. 2002-077083

(51) Int. Cl.
*G11B 27/36* (2006.01)

(52) U.S. Cl. .............................. 360/31; 360/25; 360/32; 714/42

(58) Field of Classification Search ........................ None
See application file for complete search history.

(56) References Cited

U.S. PATENT DOCUMENTS 4,901,165 A * 2/1990 Matsuo ........................ 386/109
5,386,323 A * 1/1995 Ishiwata et al. ............. 386/104
6,510,013 B1 * 1/2003 Oshio ........................... 360/32

FOREIGN PATENT DOCUMENTS

| JP | 04-036608 | 2/1992 |
|----|-----------|--------|
| JP | 04-105423 | 4/1992 |
| JP | 06-124138 | 5/1994 |
| JP | 09-084248 | 3/1997 |
| JP | 2001-184602 | 7/2001 |

OTHER PUBLICATIONS

Japanese Patent Office dated Dec. 5, 2006.

* cited by examiner

*Primary Examiner*—Jason C Olson
(74) *Attorney, Agent, or Firm*—Antonelli, Terry, Stout & Kraus, LLP.

(57) ABSTRACT

An inspection apparatus and method are disclosed for inspecting a magnetic disk or a magnetic head. A first reference signal generating source generates reference signals of a controllable oscillating frequency, and a signal switching means selects either a reference signal or test data reproduced by the magnetic head. Factors such as offsets and gain differentials among signal distribution paths, phase shifts of sampling clocks supplied to a plurality of A/D converters, and frequency-dependence of the transfer function and phase response of signal paths are identified so that errors due to these factors can be detected. Based on the detected values of these factors and errors, reference signals are utilized to compensate test data errors.

20 Claims, 5 Drawing Sheets

FREQUENCY-DEPENDENCE OF TRANSFER FUNCTION

FIG. 3

FREQUENCY-DEPENDENCE OF PHASE RESPONSE

FREQUENCY-DEPENDENCE OF TRANSFER FUNCTION

FIG. 5b

FREQUENCY-DEPENDENCE OF PHASE RESPONSE

FIG. 6 (Prior Art)

INSPECTION APPARATUS AND INSPECTION METHOD OF MAGNETIC DISK OR MAGNETIC HEAD

BACKGROUND OF THE INVENTION

Present invention relates to an apparatus and method for detecting, compensating, and inspecting for offsets and gain differentials among signal distribution paths, phase shifts of sampling clocks supplied to a plurality of A/D converters, and frequency-dependence of the transfer function and phase response of signal paths, applicable to inspection of a magnetic disk or head, using parallel operation of N pieces of A/D converters.

Conventionally, magnetic recording devices have been used as external storage of information processing devices such as workstations. With recent improvements of magnetic material or magnetic heads and enhancements in signal processing technology, especially, magnetic disk apparatus with even denser recording density and operating at a higher frequency for recording is used. It is generally known that magnetic disk apparatus is available at lower price and contributes to faster processing speed and price reduction of information processing devices.

High reliability of recording and reproducing data is required for the magnetic disk apparatus as external storage. A magnetic recording medium such as, typically, a magnetic disk, or a magnetic head for use in the magnetic disk apparatus is commonly inspected by the following method. Run the magnetic disk or magnetic head at an actual operating frequency and record and reproduce test data onto/from the magnetic disk by the magnetic head.

Figure 6:
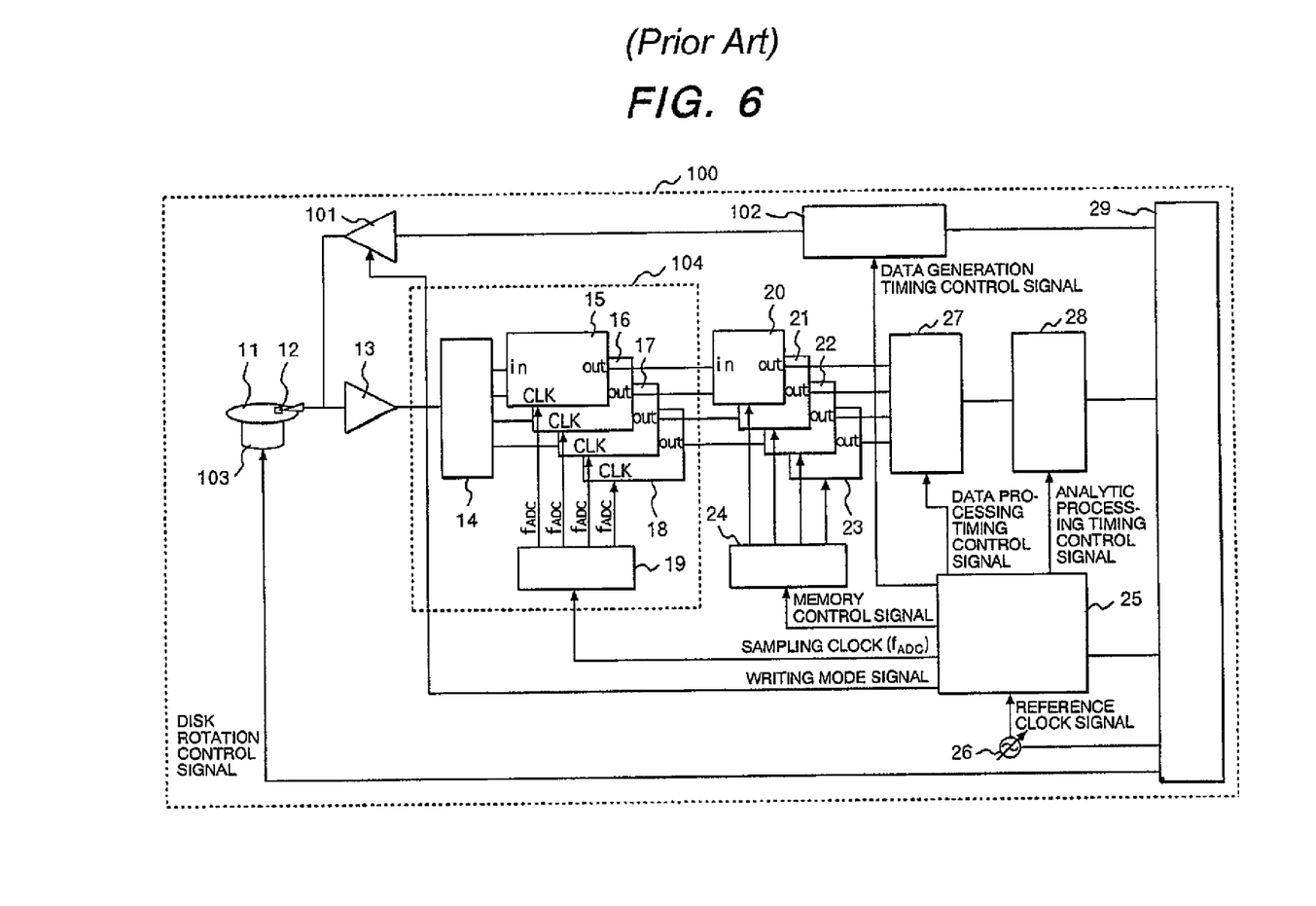
FIG. 6 is a simplified structural diagram of a prior art inspection apparatus of a magnetic disk or magnetic head.

For inspection apparatus for inspecting a magnetic disk or head in this method, a higher frequency at which test data should be recorded and reproduced is required and it is highly required that reproduced test data should be scrutinized or measured in depth and with high precision. To make the inspection apparatus meet both high-speed and high-precision requirements, a method is available in which reproduced test data is converted into digital data by A/D converters and, by processing the digital data, the test data reproducing performances or the magnetic characteristics of the magnetic disk are calculated with high precision. In order to perform inspection using test data for high-frequency performance in this method, it is necessary to use quite a higher frequency as a sampling frequency of the A/D converters. To accomplish this, the following method is taken: by parallel processing with N pieces of A/D converters, each operating at a sampling frequency $f_{ADC}$, an apparent sampling frequency that is as high as N folds is obtained. FIG. 6 illustrates an inspection apparatus of a magnetic disk or head, using four (N=4) A/D converters which perform processing in parallel.

In the inspection apparatus of a magnetic disk or magnetic recording head 100 shown in FIG. 6, a disk rotating device 103 holds and rotates a disk 11 that is a magnetic disk, a writing data generation device 102 generates and outputs test data for use in inspection. Output of the writing data generation device 102 is amplified by a writing amplifier 101. The test data is recorded as follows. Position a R/W head 12 at a test target track on the disk, write the test data onto the disk 11 having magnetic characteristics, while changing the magnetic field of the R/W head 12, based on the output of the writing amplifier 101, and record the test data on the test target track of the revolving disk 11 in a circumferential direction. Data reproduction and decision as to whether the disk is normal are performed as follows. The R/W head 12 detects change of the magnetic field, based on the test data recorded on the revolving disk 11. Signals detected by the head are amplified by a reproduction amplifier 13 and output as signals reproduced from the disk. The reproduced signals are distributed by a reproduced signal distribution circuit 14 to four (N=4) paths to four (N=4) arranged A/D converters 15 to 18 that individually convert the signals into discrete digital values, using respective sampling clock signals output from a sampling clock distribution circuit 19. The discrete digital values output from the A/D converters 15 to 18 are retained in memories 20 to 23. Based on the reproduced signal data as the discrete digital values retained in the memories 20 to 23, a data processing device 27 calculates objective measurements of the reproduced signals by arithmetic operation. Based on the measurements of the reproduced signals output from the data processing device 27, an analytic processing device 28 performs calculation and decides whether the inspected disk is normal. In this way, a magnetic recording medium such as, typically, the magnetic disk 11, or the magnetic head 12 put to inspection is inspected.

The data processing device 27 is constituted by logic circuitry such as, for example, a digital signal processor (DSP) for digital signal processing. Based on the discrete digital values of the reproduced signals retained in the memories 20 to 23, it executes interpolation or the like and computing, thereby calculating pulse amplitude or average pulse amplitude for arbitrary reproduced signal pluses. By computing for frequency analysis of the retained digital values, based on Fast Fourier Transform (FFT) or Discrete Fourier Transform (DFT), it is possible to perform in-depth inspection of the magnetic disk or magnetic head.

By employing four (N=4) A/D converters 15 to 18 for parallel processing in the inspection apparatus configuration, as described above, the signals reproduced from the disk are sampled at closer intervals in the time axis direction. Consequently, for example, a spike in the reproduced signals can be converted into discrete digital values with high precision. By using high-precision discrete digital values data in calculating magnetic disk characteristics by digital computation, high-precision inspection of a magnetic recording medium such as, typically, a magnetic disk, or a magnetic head can be performed.

This example of previous technique for magnetic disk or head inspection is disclosed in Japanese Unexamined Patent Publication 2001-184602.

SUMMARY OF THE INVENTION

In the previous technique example, in order to convert the signals reproduced from the disk into digital values at a high speed, after the reproduced signal distribution circuit distributes the reproduced signals to N pieces of A/D converters, the N pieces of A/D converters individually convert the signals into digital values, wherein $1/(N \times f_{ADC})$ is set for phase difference in the sampling frequencies $f_{ADC}$ respectively supplied to the A/D converters, and the digital values are arranged in time sequence and processed by appropriate computation. However, a problem of lowered precision of measurements was presented due to the following: Offset voltages and gain differentials occur in the output section of the reproduced signal distribution circuit because of variation in its components and processes within the IC. Also, there is aperture variation among the A/D converters and variation in the delay characteristics following the distribution of the sampling clocks. Consequently, divergence from the ideal sampling clock phase difference occurs and errors occur in the digital data outputs. Moreover, the transfer function and phase response of the signal paths through which the reproduced signals pass before being A-D converted varies, depending on the frequencies of measurement, and this is also a significant factor of lowing the measurement precision.

It is an object of the present invention to provide an apparatus and method for inspecting a magnetic recording medium such as, typically, a magnetic disk, or a magnetic head, the apparatus including means for detecting offsets and gain differentials among signal distribution paths, phase shifts of frequencies of sampling signals-supplied to a plurality of A/D converters, and frequency-dependence of the transfer function and phase response of signal paths, and means for compensating sampled data through the use of the detected values.

In order to achieve the foregoing object, the present invention provides an apparatus for inspecting a magnetic recording medium or magnetic head, which inspects the characteristics of the magnetic recording medium or magnetic head in the following procedure: record test data onto the magnetic recording medium by a magnetic head, reproduce the recorded test data by the magnetic head, distribute the reproduced test data to N pieces of signals paths, convert the signals into discrete digital values by N pieces of A/D conversion means, and execute appropriate computation with the discrete digital values. This apparatus comprises a first reference signal generating source which generates reference signals of a controllable oscillating frequency $f_{in}$, a signal switching means for selecting and outputting either a reference signal generated by the first reference signal generating source or test data reproduced by the magnetic head, a second reference signal generating source which supplies timing signals of frequency $f_{ADC}$ to the N pieces of A/D conversion means for triggering signal sampling and conversion, while controlling the frequency $f_{ADC}$ of a timing signal to be supplied to an individual A/D conversion means, and a data manipulation means in which errors occurring in parallel elements controlled to operate parallel of the N pieces of A/D conversion means are detected by appropriate computation and the detected values of errors are retained, and subsequent similar errors are compensated with the detected values during test data computation.

The invention also provides a method for inspecting a magnetic recording medium or magnetic head, which inspects the characteristics of the magnetic recording medium or magnetic head in the following procedure: record test data onto the magnetic recording medium by a magnetic head, reproduce the recorded test data by the magnetic head, distribute the reproduced test data to N pieces of signals paths, convert the signals into discrete digital values by N pieces of A/D conversion means, and execute appropriate computation with the discrete digital values. This method comprises a step of generating reference signals of a controllable oscillating frequency $f_{in}$ by a first reference signal generating source, a step of selecting and outputting either a reference signal generated by the first reference signal generating source or test data reproduced by the magnetic head, a step of generating timing signals of frequency $f_{ADC}$ which are supplied to the N pieces of A/D conversion means for triggering signal sampling and conversion by a second reference signal generating source, wherein the second reference signal generating source controls the frequency $f_{ADC}$ of a timing signal to be supplied to an individual A/D conversion means, and a data manipulation step in which errors occurring in parallel elements controlled to operate parallel of the N pieces of A/D conversion means are detected by computation and the detected values of errors are retained, and subsequent similar errors are compensated with the detected values during test data computation.

DETAILED DESCRIPTION OF THE PREFERRED EMBODIMENTS

Embodiment 1

The present invention now is described fully hereinafter with reference to the accompanying drawings, in which preferred embodiments of the invention are shown. Preferred Embodiment 1 of the present invention is shown in FIG. 1.

Figure 1:
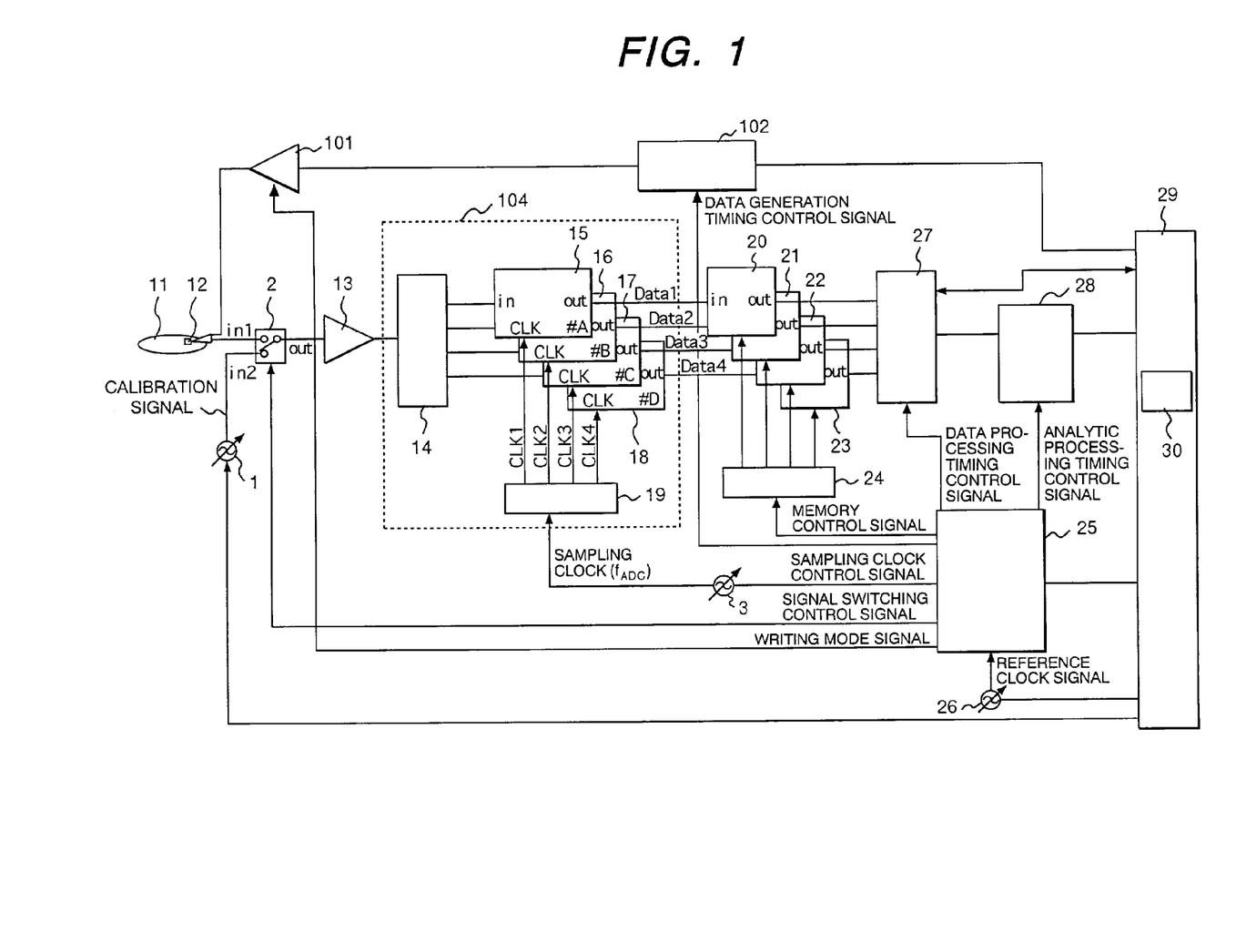
FIG. 1 is a simplified structural diagram of an inspection apparatus according to a preferred Embodiment 1 of the present invention.

FIG. 1 is a simplified structural diagram of an inspection apparatus of a magnetic recording medium such as, typically, a magnetic disk, or a magnetic head, according to the present invention. For inspecting a magnetic recording medium such as, typically, a magnetic disk, test data is recorded onto the magnetic disk, using a standard magnetic head. For inspecting a magnetic head, test data is recorded onto a standard magnetic disk by the magnetic head. In subsequent operation of reproducing the test data, a signal switching circuit 2 at a stage following a R/W head 12 receives a signal from a timing control device 25 and outputs either a signal read by the RW head 12 from the magnetic disk 11 or a reference signal output from a reference signal generation circuit 1 to a reproduction amplifier 13. The reference signal generation circuit 1 outputs an arbitrary waveform signal and can be controlled by a signal from a control device 29. The signal switching circuit 2 selects the reference signal when any of the above-mentioned factors of measurement errors is detected.

First, methods for detecting offsets and gain differentials among the signal distribution paths and phase shifts of sampling clocks supplied to four (N=4) A/D converters 15 to 18 and methods of compensating errors due to these factors will be described. First, the detection methods are described. The factors of measurement errors of reproduced signal values can be detected by data processing with a sine-wave reference signal of frequency $f_{in}$. Two methods of such data processing are available. A first method is such that the frequency $f_{in}$ of the reference signal and the sampling frequency $f_{ADC}$ of an individual A/D converters are set to satisfy a coherent relationship between them and, then, computation of EFT or DFT is executed for each digital value obtained by conversion of the A/D converters 15 to 18, thereby detecting a fault. A second method is such that a simultaneous equation is evaluated by using two digital data values obtained by conversion of the A/D converters 15 to 18, thereby detecting a fault.

In the first method, for the A/D converters 15 to 18 that perform parallel processing, initially, the frequency $f_{in}$ of the reference signal and the sampling frequency $f_{ADC}$ of an individual A/D converter are set to satisfy a coherent relationship there between which will be described later. Then, computation of FFT (or DFT) is executed to detect offset voltages, gain differentials, and phase shifts in the signal distribution paths. The coherent relationship is a necessary condition for executing the computation of FFT (or DFT) at a high speed and with high precision without using a window function. In the following, this first method will be explained in detail.

The frequency $f_{in}$ of the reference signal should be equal to or below $f_{ADC}/2$ which is the upper limit of a frequency range in which a waveform is reproducible in the sampling theorem and fall within the frequency range of signals reproduced from the disk. Equation 1 expresses a time function of reference signal voltage $V_{in}$ output by the reference signal generation circuit 1.

$$V_{in}=A_0 \sin(2\Pi \times f_{in} \times t) \quad \text{(Equation 1)}$$

where $A_0$ is amplitude and t is time.

For example, when an offset voltage ($V_{DCA}$), gain differential ($1+\Delta x_A$), and phase ($\phi_A$) occur in the signal path to the A/D converter (#A) 15, a signal voltage $V_{inA}$ which is expressed by equation 2 appears at the input port of the A/D converter (#A) 15.

$$V_{inA}=A_0(1+\Delta x_A)\sin(2\Pi \times f_{in} \times t+\phi_A)+V_{DCA} \quad \text{(Equation 2)}$$

Here, in order to prevent a spectrum leak during frequency computation by FFT (or DFT), it is necessary to set the reference signal frequency $f_{in}$, sampling frequency $f_{ADC}$, the number of data to be sampled p, and the number of sine wave periods to be input m to satisfy the coherent relationship shown in equation 3, where p and m must be set to be integers that are mutually prime. In the following explanation, it is assumed that $p=2^n$ in order to enable FFT computation. However, it is preferable to apply $p \neq 2^n$ when executing DFT computation.

$$f_{in}/f_{ADC}=m/p \quad \text{(Equation 3)}$$

By setting, for example, m=7, p=1028, $f_{ADC}$=1.5 Gsps, and $f_{in}$=10.25390625 MHz, the coherent relationship is established.

When executing FFT computation without using the coherent relationship, a spectrum leak can be reduced by using a window function or the like, but it is not possible to accomplish such precise computation as achieved when the coherent relationship is satisfied and it takes longer to execute this computation. Therefore, the computation method of the present invention is superior.

A value resulting from Fourier Transform $F_L$ (L=0, ..., N/2), obtained by FFT or DFT computation, represents a sine wave signal, L periods of which fall within the transformation range. It is possible to calculate its amplitude by $2\times|F_L|$ and phase by arg ($F_L$) $|F_0|$ represents a direct current component. Thus, amplitude $A_0$ ($1+\Delta X_A$) of $V_{inA}$ can be obtained by calculating $2\times|F_m|$ and phase $\phi_A$ can be obtained by calculating arg ($F_m$)+$\Pi/2$. In this way, an offset voltage at the input port of each A/D converter (#A) 15, (#B) 16, (#C) 17, (#D) 18 can be calculated by equation 4, and a gain differential by equation 5. A sampling clock phase shift can be obtained as shift $\Delta(t)$ along the time axis by evaluating equation 6 after calculating phase $\phi_A$, $\phi_B$, $\phi_C$, $\phi_D$. In equation 6, $\phi_{(BA, CA, DA)}$ is an ideal phase difference between two sampling clocks each supplied to #B and #A, #C and #A, or #D and #A. While equation 6 is described to obtain the phase shifts of the sampling clocks to #B, #C, and #D relative to the sampling clock to #A, it is possible to obtain other sampling clock phase shifts relative to the sampling clock to another A/D conversion circuit, using this equation.

$$V_{DC(A, B, C, D)}=|F_{0(A, B, C, D)}| \quad \text{(Equation 4)}$$

$$1+\Delta x_{(A, B, C, D)}=2\times|F_{m(A, B, C, D)}|/A_0 \quad \text{(Equation 5)}$$

$$\Delta t_{(B, C, D)}=(\phi_{(B, C, D)}-\phi_B-\phi_{(BA, CA, DA)})/2\Pi \cdot f_{in} \quad \text{(Equation 6)}$$

In the second method, a simultaneous equation is evaluated, using two data sampled and converted by each A/D converters, and the phase and amplitude of signals at the input port of each A/D conversion circuit 15 to 18 relative to the first sampled data as an origin are calculated.

In the case of this method, first, offset voltages $V_{DCA}$, $V_{DCB}$, $V_{DCC}$, $V_{DCD}$ are detected by reading a digital value when 0 is input. Then, the reference signal which is given by the above-mentioned equation 1 is input and gain differential and phase values are obtained.

Here, when an offset voltage ($V_{DCA}$), gain differential ($1+\Delta x_A$), and phase ($\phi_A$) occur at the input port of the A/D converter (#A) 15, a k-th digital value $S_{Ak}$ (k=0, ..., $2^n-1$) output by the A/D converter (#A) 15 is expressed by equation 7.

$$S_{Ak}=A_0(1+\Delta x_A)\sin(2\Pi \times f_{in}/f_{ADC} \times k+\phi_A)+V_{DCA} \quad \text{(Equation 7)}$$

By assigning digital values such as k=0, 1, etc. and evaluating the simultaneous equation with $(1+\Delta x_A)$ and $\phi_A$ being variable, values of gain differential $(1+\Delta x_A)$ and phase $\phi_A$ relative to the initially sampled data ($S_{A0}$) are obtained. For the remaining A/D converters #B, #C, and #D, after the gain differential and phase values relative to the initially sampled data with k=0 ($S_{B0}$, $S_{C0}$, $S_{D0}$) are obtained similarly, phase shifts (represented in time) are calculated by the above-mentioned equation 6.

The offsets and gain differentials among the signal distribution paths and the phase shifts of the sampling clocks supplied to the N pieces of A/D converters, detected by the above-described methods, are retained in a memory 30 provided in, for example, the control device 29, after being detected by computation of the data processing device 27.

Then, the compensation method for test data or reference signals including the above-mentioned measurement errors will be described.

Compensation of offset voltages and gain differentials is performed in such a manner that the data processing device 27 reads digital value data from the memories 20 to 23 and executes arithmetic operation for each digital data. For example, the data processing device 27 reads digital values from the memory 20 at a stage following the A/D converter #A 15 and, at the same time, reads $V_{DCA}$ and gain differential $(1+\Delta X_A)$ from the memory in the control device. It subtracts the offset voltage $V_{DCA}$ from all data read from the memory 20 and multiples the data by the reciprocal number of $(1+\Delta X_A)$, thereby the sampled and converted data can be compensated. For the remaining A/D conversion circuits #B, #C, and #D, the sampled and converted data by them is compensated in the same manner of data manipulation as above.

Next, compensation of errors due to the phase shifts of the sampling clocks supplied to the A/D converters 15 to 18 will be described. In the prior art method, the data processing device 27 handles all data transferred from the memories 20 to 23 as the data converted by the A/D converters among which an ideal phase difference between the sampling clocks supplied to two circuits is assumed existing. After rearranging the data, for example, in the order of $S_{A0} \rightarrow S_{B0} \rightarrow S_{C0} \rightarrow S_{D0} \rightarrow S_{A1} \rightarrow S_{B1}$ ..., the data processing device manipulates them, assuming that they are arranged at equal time intervals of $1/(4\times f_{ADC})$. This caused the problem of measurement errors due to the phase shifts of the sampling clocks. In the method, of the present invention, after rearranging all the data transferred from the memories in the order of $S_{A0} \rightarrow S_{B0} \rightarrow S_{C0} \rightarrow S_{D0} \rightarrow S_{A1} \rightarrow S_{B1} \ldots$, the data processing device reads the phase shifts $\Delta t_{(B, C, D)}$ of the sampling clocks detected beforehand in the above-described manner and arranges the data at unequal time interfaces, for example, in this way: following $S_{A0}$, it inserts $\Delta t_B + 1/(4 \times f_{ADC})$ before $S_{B0}$, $\Delta t_C + 2/(4 \times f_{ADC})$ before $S_{C0}$, $\Delta t_D + 3/(4 \times f_{ADC})$ before $S_{D0}$, and $1/f_{ADC}$ before $S_{A1}$. Then, it obtains an arbitrary function of the data arranged at unequal time intervals along the time axis, executes interpolation using this function as an interpolation function, and calculates the data arranged at unequal time intervals. Thereby, it compensates the measurement errors due to the phase shifts of the sampling clocks. As the interpolation function to be used for interpolation, for example, a higher-order spline interpolation and a linear interpolation are mentioned here; however, applicable interpolation functions are not limited to specific ones.

Next, a method of detecting frequency-dependence of the transfer function of signal paths and its compensation method will be described. What is detected and compensated is the frequency-dependence of the transfer function of the reproduction amplifier 13, reproduced signal distribution circuit 14, input buffers of the A/D converters 15 to 18, and wiring connecting these circuits on the IC board. For this detection, it is assumed that the offsets and gain differentials among the signal distribution paths and the phase shifts of the sampling clocks supplied to four (N=4) A/D converters 15 to 18 have been detected beforehand by either of the above-described methods and the reference signal frequency when the above detection was performed is an arbitrary frequency $f_{in}$. When detecting the frequency-dependence of the transfer function, the signal switching circuit 2 is set to input the output signals of the reference signal generation circuit 1 to the circuit at the following stage.

The frequency of the reference signal is set at frequency $f_{in2}$ different from $f_{in}$. The frequency $f_{in2}$ to be set is selected from all frequencies of signals reproduced as test data and controlled so that the above-mentioned coherent relationship is established. The output signals of the reference signal generation circuit 1, after passing through the reproduction amplifier 13, is distributed to four (N=4) paths by the reproduced signal distribution circuit 14 and input to four (N=4) A/D converters 15 to 18 controlled to operate in parallel. At the rise or fall timing of the sampling signals output by the sampling clock distribution circuit 19, the A/D converters 15 to 18 convert the input analog signals into digital values. Equation 8 expresses an analog signal to be input to each A/D conversion circuit #A to #D.

$$V_{in\,(A, B, C, D)} = A_0 \times \Delta A_{fin2}(1 + \Delta x_{(A, B, C, D)}) \sin(2\pi \times f_{in2} \times t + \phi_{(A, B, C, D)}) + V_{DC\,(A, B, C, D)} \quad \text{(Equation 8)}$$

In this equation, $\Delta A_{fin2}$ is a transfer function at $f_{in2}$ relative to the transfer function at frequency $f_{in}$ and this function value varies, depending on the frequency.

Figure 2:
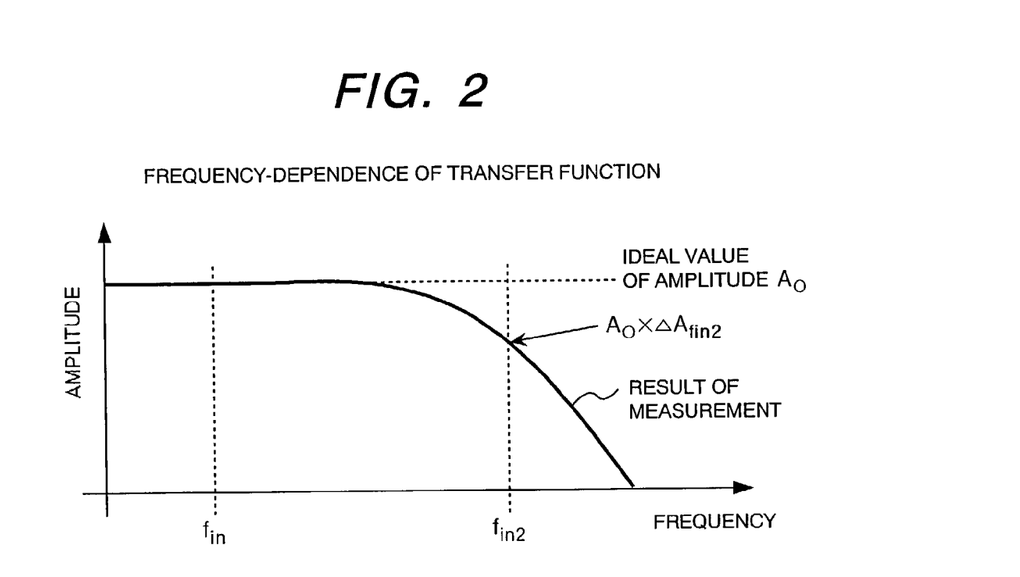
FIG. 2 is a graph showing frequency-dependence of a transfer function of a signal path.

The digital values obtained by conversion of the A/D converters 15 to 18 are retained as digital data in the memories 20 to 23 and, then, output to the data processing device 27, triggered by a control signal from the control device 29. For all data received from the memories 20 to 23, the data processing device 27 compensates measurement errors due to the offsets and gain differentials among the signal distribution paths and the phase shifts of the sampling clocks supplied to the four (N=4) A/D converters 15 to 18 in the manner described above. For the thus compensated data rearranged in time sequence, the data processing device 27 executes, for example, FFT (or DFT) computation, thereby calculating amplitude $A_0 \times \Delta A_{fin2}$, and, moreover, by dividing the thus calculated value by $A_0$, it obtains $\Delta A_{fin2}$. Because the coherent relationship between the reference signal frequency and the sampling signal frequency has been established for all signal paths and sampled data to be processed by FFT computation, the coherent relationship is inherited to all the data rearranged in time sequence and processed by FFT computation and, consequently, $\Delta A_{fin2}$ can be calculated with high precision. By performing this same process for signals in the frequency range of test data, the frequency-dependence of the transfer function for $\Delta A_{fin2}$, or the signal paths as illustrated in FIG. 2 can be detected. It is ideal that $\Delta A_{fin2}$ remains at 1 independent of the frequency of sampled signals and deviation from this ideal value causes errors. The detected values are retained in the memory 30 of the control device 29.

Then, the method of compensating the frequency-dependence of the transfer function of the signal paths will be described. Triggered by a control signal from the control device 29, connection is made between the in1 terminal and the out2 terminal of the signal switching circuit 2 and test data reproduced by the magnetic head is input to the reproduction amplifier. The test data amplified by the reproduction amplifier is converted into digital values by the four (N=4) A/D converters 15 to 18 operating in parallel and the digital values are retained in the memories 20 to 23. The data processing device 29 reads the digital values from the memories 20 to 23 and executes data manipulation. First, the data processing device compensates the errors included in the digital values due to the offset voltages and gain differentials among the signal distribution paths and the phase shifts of the sampling clocks in the above-described method. For all subsequent data, the data processing device executes frequency analysis by FFT (or DFT) computation; thereby, for example, it obtains Fourier coefficients $F_L$ of all frequencies within the test bandwidth, reads the detected values indicating frequency-dependence of transfer function from the memory 30, corrects the Fourier coefficient of a frequency by $\Delta A_{fin2}$ of the frequency (division applies to this instance). In this way, compensation of frequency-dependence of transfer function can be performed.

Next, a method of detecting frequency-dependence of the phase response of signal paths and its compensation method will be described. What is detected and compensated is the frequency-dependence of the phase response of the reproduction amplifier 13, reproduced signal distribution circuit 14, input buffers of the A/D converters 15 to 18, and wiring connecting these circuits on the IC board.

For this detection, it is assumed that the offsets and gain differentials among the signal distribution paths and the phase shifts of the sampling clocks supplied to four (N=4) A/D converters 15 to 18 have been detected beforehand by either of the above-described methods and the reference signal frequency when the above detection was performed is an arbitrary frequency $f_{in}$. When detecting the frequency-dependence of the phase response, the signal switching circuit 2 is set to input the output signals of the reference signal generation circuit 1 to the reproduction amplifier 13. During this detection, the reference signal generation circuit 1 outputs signals of two or more frequencies ($f_{ina}$, $f_{inb}$, $f_{inc}$, etc.). Among these frequencies, if $f_{ina}$ is the minimum frequency, the remaining ones $f_{inb}$, $f_{inc}$, ... are always integral multiples of the minimum frequency and their mutual relations in phase can be controlled. Assume that the reference signal generation circuit 1 is now outputting reference signals of two frequencies $f_{ina}$ and $f_{inb}$ ($f_{inb} = 2 \times f_{ina}$), the phase of both being 0. The reference signals pass through the signal switching circuit 2 and reproduction amplifier 13 and are distributed by the reproduced signal distribution 14 to four (N=4) paths, converted into digital values by the A/D converters 15 to 18, and the digital values are retained in the memories 20 to 23. Here, the proportion of the minimum reference signal frequency $f_{ina}$ to the sampling clock frequency $f_{ADC}$ of each A/D converters 15 to 18 and the proportion of the number of sine wave periods of $f_{ina}$ to the number of digital values data $2^n$ (n=an integer of 1 or more) to be output from each A/D converters 15 to 18 within the measurement range are controlled to satisfy a coherent relationship. The data processing device 27 first reads the data from the memories 20 to 23 and rearranges in time sequence the digital values as the output data from the A/D converters 15 to 18. Then, the data processing device compensates error factors other than the frequency-dependence of phase response included in all output data. For all the rearranged data, the data processing device executes FFT (or DFT) computation and the values obtained by Fourier Transform $F_L$ (L=0, $2^{n-1}$) correspond to the frequencies of the signals. Phase values of the frequencies are calculated as described above. From the calculated phase values, the phase shifts of the plurality of frequencies of the reference signals can be obtained; for example, phase shift $\Delta\phi_{ba}$ of $f_{inb}$ relative to $f_{ina}$ can be obtained by equation 9.

$$\Delta\phi_{ba} = arg(F_{2m}) - arg(F_m) \qquad \text{(Equation 9)}$$

Figure 3:
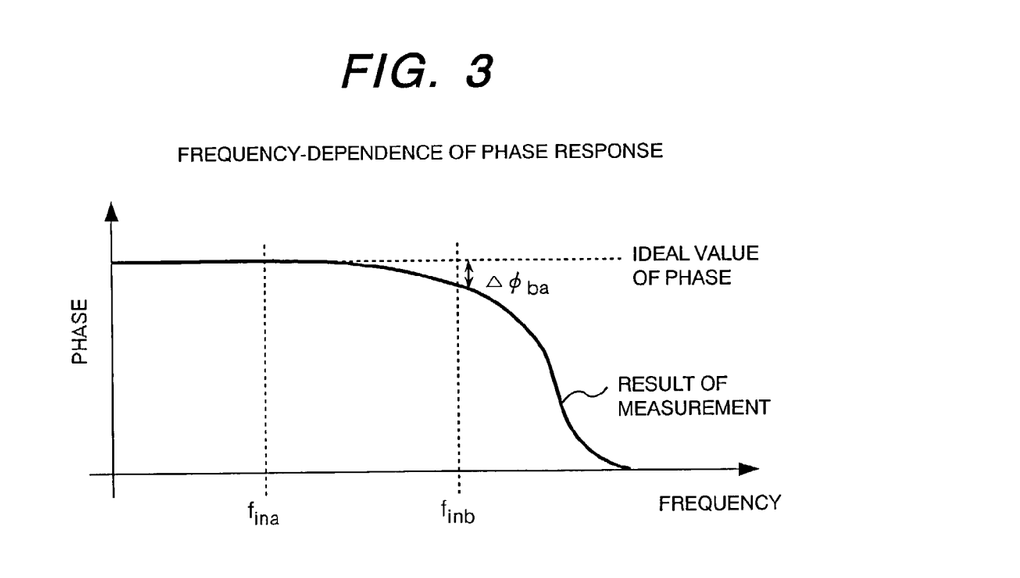
FIG. 3 is a graph showing frequency-dependence of phase response of a signal path.

By performing this same process for signals in the frequency range of test data, the frequency-dependence of the phase response of the signal paths, illustrated in FIG. 3, can be detected. It is ideal that the phase shift remains at 0 independent of the frequency of sampled signals and deviation from this ideal value causes errors. The detected values are retained in the memory 30 of the control device 29.

Then, the method of compensating the detected frequency-dependence of phase response will be described. Triggered by a control signal from the control device 29, connection is made between the in1 terminal and the out2 terminal of the signal switching circuit 2 and test data reproduced by the magnetic head is input to the reproduction amplifier 13. The test data amplified by the reproduction amplifier 13 is converted into digital values by the four (N=4) A/D converters 15 to 18 operating in parallel and the digital values are retained in the memories 20 to 23. The data processing device 29 reads the digital values from the memories 20 to 23 and executes data manipulation. First, the data processing device compensates the errors included in the digital values due to the offset voltages and gain differentials among the signal distribution paths and the phase shifts of the sampling clocks in the above-described method. For all subsequent data, the data processing device executes frequency analysis by FFT (or DFT) computation; thereby, for example, it obtains Fourier coefficients $F_L$ (L=0, . . . , $2^{n-1}$) of all frequencies within the test bandwidth, reads the detected values indicating frequency-dependence of phase response from the memory, corrects the phase shift from the phase of each frequency (subtraction applies to this instance). In this way, compensation of frequency-dependence of phase response can be performed.

Embodiment 2

Figure 4:
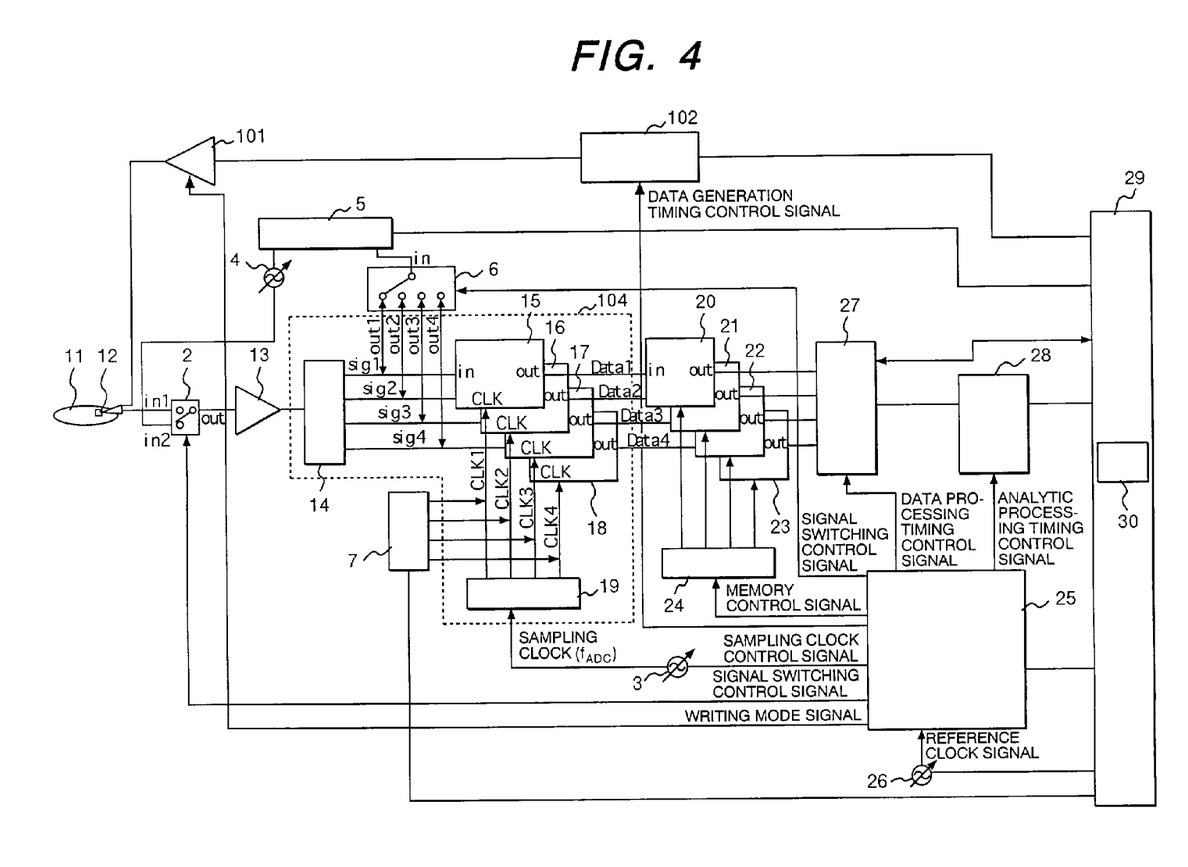
FIG. 4 is a simplified structural diagram of an inspection apparatus according to a preferred Embodiment 2 of the present invention.

Preferred Embodiment 2 of the present invention is shown in FIG. 4. FIG. 4 is a simplified structural diagram of another example of an inspection apparatus of a magnetic recording medium such as, typically, a magnetic disk, or a magnetic head, according to the present invention. The signal switching circuit 2 at the stage following the R/W head 12 receives a signal from the timing control device 25 and outputs either a signal read by the RW head 12 from the magnetic disk 11 or a reference signal output from the reference signal generation circuit 4 to the reproduction amplifier 13. The reference signal generation circuit 4 outputs an arbitrary waveform signal and can be controlled by a signal from a measuring device of signal transfer characteristics and phase response 5. By switch operation of a signal switching device 6, triggered by a control signal form the control device 29, a signal distribution path is selected which enables the measuring device of signal transfer characteristics and phase response 5 to measure signal characteristics. A waveform measuring device 7 is means for measuring output signals of the sampling clock distribution circuit 19 along the time axis. The signal switching circuit 2 selects in2 when detecting the above-mentioned factors of measurement errors and outputs reference signals to the reproduction amplifier 13.

Using this inspection apparatus, methods for detecting offsets and gain differentials among the signal distribution paths and frequency-dependence of the transfer function and phase response of the signal paths will now be described.

Offset voltages $V_{DCA}$, $V_{DCB}$, $V_{DCC}$, $V_{DCD}$ appearing at the input ports of the A/D converters 15 to 18 shown in FIG. 4 can be detected, using digital values corresponding to 0 inputs. 0 inputs to the A/D converters 15 to 18 are converted into digital values that are read per signal path and retained in the memory 30 of the control device 29.

Figure 5A:
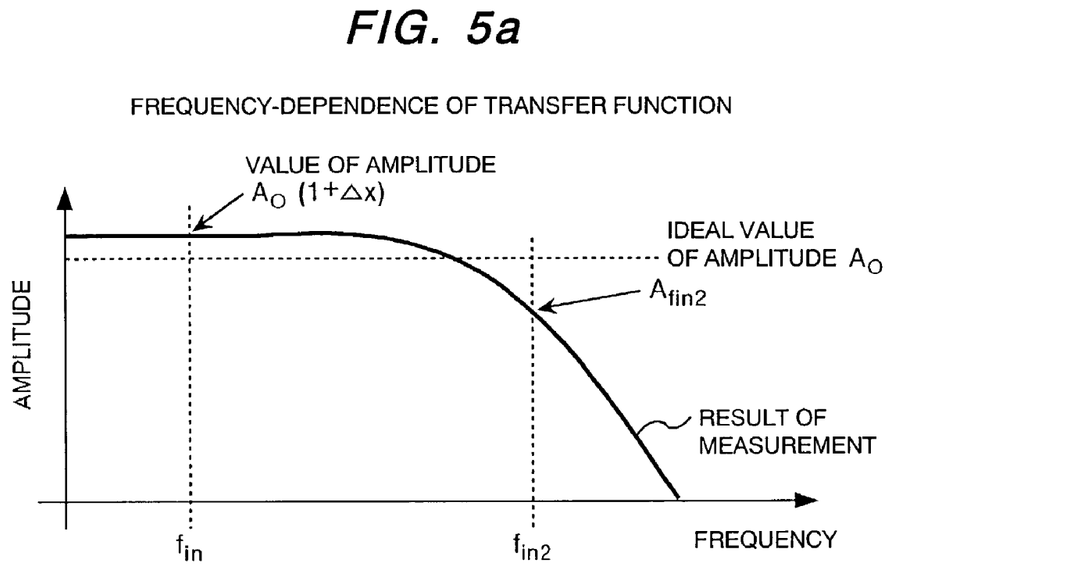
FIG. 5a is a graph showing frequency-dependence of a transfer function of a signal path.
Figure 5B:
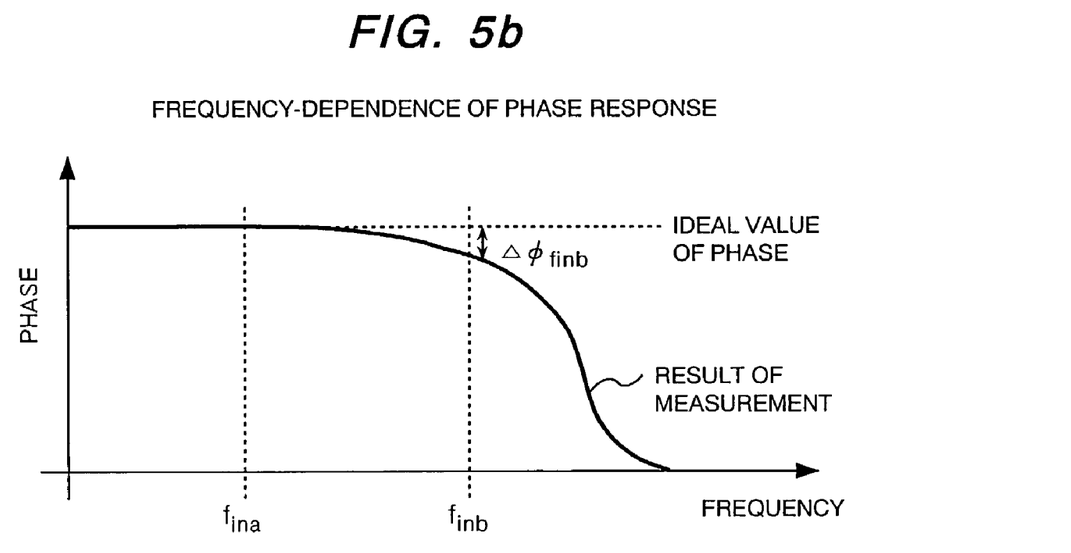
FIG. 5b is a graph showing frequency-dependence of phase response of a signal path.

Gain differentials among the signal distribution paths and frequency-dependence of the transfer function and phase response of the signal paths can be detected in the following way. The reference signal generation circuit 4 controls reference signal voltage $V_{in}$ to output $V_{in}$ (with ideal amplitude $A_0$, frequency $f_{in}$) given by the above-mentioned equation 1 and the measuring device of signal transfer characteristics and phase response 5 directly reads signals sig1 to sig4 at the input ports of the A/D converters 15 to 18. For example, when detection is performed for a signal at the input port of the A/D converters (#A) 15, the signal switching device 6 receives a signal from the control device and switches to the appropriate contact so that the measuring device of signal transfer characteristics and phase response 5 can read the sig1 signal. The measuring device of signal transfer characteristics and phase response 5 has the same function as a measuring device such as, for example, a network analyzer. It takes measurements of signals passing through the signal paths from the output of the reference signal generation circuit 1 to the input ports of the A/D converters 15 to 18 and inspects for frequency-dependence of transfer function and phase response as illustrated in FIG. 5. In FIG. 5a, the amplitude of measured signals is plotted on the ordinate; in FIG. 5b, the phase of measured signals is plotted on the ordinate. In both FIGS. 5a and 5b, reference signal frequencies $f_{in}$ are plotted on the abscissa. In FIG. 5a, the level amplitude portion of the curve indicates amplitude $A_0$ $(1+\Delta x_A)$ including a gain differential and the gain differential $(1+\Delta x_A)$ can be detected by reading this amplitude value. The detected gain differential is retained in the memory of the control device. This detected gain differential is output to the data processing device 27 during compensation. Compensation can be performed by making corrections, that is, multiplying all data by the reciprocal number $1/(1+\Delta x_A)$ of the gain differential. Although it is ideal that the above amplitude $A_0$ is level over the range of all frequencies, because of frequency-dependence of transfer function, if present, the signal amplitude decreases (or increases) with the rise of frequency $f_{in}$ as is shown in FIG. 5a. If the amplitude of a signal of frequency $f_{in2}$ is described by $A_{fin2}$, a value of $A_0$ $(1+\Delta x_A)/A_{fin2}$ is detected at $f_{in2}$. Similarly, such a value is detected at all frequencies within the frequency range and the detected values indicating frequency-dependence of transfer function are retained in the memory 30 of the control device 29. These detected values indicating frequency-dependence of transfer function are output to the data processing device 27 during compensation and compensation can be performed by making corrections in the same method as described in the foregoing Embodiment 1. FIG. 5b is a graph indicating frequency-dependence of phase response. For the phase response, also, it is ideal that the phase is constant independent of the frequency of sampled signals. The measuring device of signal transfer characteristics and phase response 5 detects phase differentials $\Delta\phi_{fin}$ per frequency $f_{in}$ from the ideal phase value and the detected phase differentials are retained in the memory 30 of the control device 29. The detected phase differentials indicating frequency-dependence of phase response are output to the data processing device 27 during compensation and compensation can be performed by making corrections in the same method as described in the foregoing Embodiment 1.

Then, a method of detecting errors due to phase shifts of sampling clocks supplied to the A/D converters 15 to 18 will be described. The waveform measuring device 7 shown in FIG. 4 is able to measure the waveforms of signal voltages along the time axis. By taking concurrent measurements of sampling clocks CLK1 to CLK4 which are output from the sampling clock distribution circuit 19 to the A/D conversion circuits 15, the waveform measuring device can measure sampling clock phase shifts $\Delta t$ (represented in time). The measured phase shifts are retained as detected values in the memory 30 of the control device 29 and output to the data processing device 27 during compensation. Compensation can be performed by making corrections in the same method as described in the foregoing Embodiment 1.

Inspection of a magnetic recording medium such as, typically, a magnetic disk, in accordance with the present invention, is carried out in the following procedure: record test data onto the magnetic disk by a standard magnetic head, reproduce the recorded test data by the magnetic head, distribute the reproduced test data to N signals paths, convert the signals into discrete digital values by N pieces of A/D conversion means, execute appropriate computation with the discrete digital values. The magnetic disk inspection method is characterized by comprising the following steps.

First, record test data onto the magnetic disk with the standard magnetic head. When inspecting a magnetic head, record test data onto a standard magnetic disk by the magnetic head. The subsequent test data reproduction process comprises a step of generating reference signals of a controllable oscillating frequency $f_{in}$ by a first reference signal generating source 1, a step of selecting and outputting either a reference signal generated by the first reference signal generating source or test data reproduced by the magnetic head, a step of generating timing signals of frequency $f_{ADC}$ which are supplied to the N pieces of A/D conversion means for triggering signal sampling and conversion by a second reference signal generating source 3, wherein the second reference signal generating source controls the frequency $f_{ADC}$ of a timing signal to be supplied to an individual A/D conversion means, and a data manipulation step in which errors occurring in parallel elements controlled to operate parallel of the N pieces of A/D conversion means are detected by computation and retained and the errors are compensated through the use of the detected values during test data computation. As compared with the prior art inspection methods which do not including the above steps for inspection and compensation, more precise inspection can be realized by corrections described in the foregoing embodiments of the present invention.

The methods of detecting different kinds of errors in accordance with the present invention will be summarized below. Their detailed processes are as described in the foregoing embodiments. First, offset errors are detected by FFT computation using coherent sampling or 0 inputs. Gain differential errors are detected by FFT computation using coherent sampling or based on a simultaneous equation or values measured by the measuring device of signal transfer characteristics. Phase shift errors are also detected by FFT computation using coherent sampling or based on a simultaneous equation or values measured by the measuring device of signal transfer characteristics. Frequency-dependence of phase response and phase response is also detected by-detected by FFT computation using coherent sampling or based on a simultaneous equation or values measured by the measuring device of signal transfer characteristics.

The methods of corrections and compensation through the use of the detected errors in accordance with the present invention will be summarized below. Their detailed processes are as described in the foregoing embodiments. First, offsets detected in sets of data output from each of the A/D converters (processing means) are corrected consistently, using the appropriate error value. In the foregoing embodiments, the offsets are corrected consistently by subtraction. Gain differentials detected in sets of data output from each of the A/D converters (processing means) are also corrected consistently, using the appropriate error value. In the foregoing embodiments, the gain differentials are corrected consistently by subtraction. Phase shifts are treated as data sampled at unequal intervals and, by interpolation, data sampled at equal intervals is calculated, corrected, and compensated. Frequency-dependence of transfer function is corrected by the measured amplitude values per frequency. In the foregoing embodiments, it is corrected by multiplication. Frequency-dependence of phase response is compensated with the measured phase values per frequency.

Inspection of a magnetic head in accordance with the present invention begins with recording test data onto a standard magnetic disk by the magnetic head. In the subsequent test data reproduction, the magnetic head can be inspected through the same process steps as for magnetic disk inspection.

Typical aspects of the present invention described hereinbefore are as follows:

In an apparatus for inspecting a magnetic recording medium, which inspects the magnetic recording medium characteristics in a procedure comprising recording test data onto the magnetic recording medium by a magnetic head, reproducing the recorded test data by the magnetic head, distributing the reproduced test data to N pieces of signals paths, converting the signals into discrete digital values by N pieces of A/D conversion means, and executing appropriate computation with the discrete digital values; an apparatus for inspecting a magnetic disk comprising a first reference signal generating source which generates reference signals of a controllable oscillating frequency $f_{in}$, a signal switching means for selecting and outputting either a reference signal generated by the first reference signal generating source or test data reproduced by the magnetic head, a second reference signal generating source which supplies timing signals of frequency $f_{ADC}$ to the N pieces of A/D conversion means for triggering signal sampling and conversion, while controlling the frequency $f_{ADC}$ of a timing signal to be supplied to an individual A/D conversion means, and a data manipulation means in which errors occurring in parallel elements controlled to operate parallel of the N pieces of A/D conversion means are detected by appropriate computation and the detected values of errors are retained, and subsequent similar errors are compensated with the detected values during test data computation.

In an apparatus for inspecting a magnetic recording medium, which inspects the magnetic recording medium characteristics in a procedure comprising recording test data onto the magnetic recording medium by a magnetic head, reproducing the recorded test data by the magnetic head, distributing the reproduced test data to N pieces of signals paths, converting the signals into discrete digital values by N pieces of A/D conversion means, and executing appropriate computation with the discrete digital values; an apparatus for inspecting a magnetic disk comprising a first reference signal generating source which generates reference signals of a controllable oscillating frequency $f_{in}$, a first signal switching means for selecting and outputting either a reference signal generated by the first reference signal generating source or test data reproduced by the magnetic head, a second signal generating source which supplies timing signals of frequency $f_{ADC}$ to the N pieces of A/D conversion means for triggering signal sampling and conversion, while controlling the frequency $f_{ADC}$ of a timing signal to be supplied to an individual A/D conversion means, a means for measuring signal transfer characteristics and phase response at the input ports of the N-pieces of A/D conversion means, a second signal switching means for selecting a signal to be measured by the means for measuring signal transfer characteristics and phase response, a means for measuring the waveforms of the timing signals to be supplied to the N pieces of A/D conversion means for triggering signal sampling and conversion to discrete digital values, a means for retaining detected values of errors which have occurred in parallel elements controlled to operate parallel of the N pieces of A/D conversion means and have been detected by the means for measuring signal transfer characteristics and phase response and the means for measuring the waveforms of the timing signals, and a data manipulation means for compensating errors occurring in the parallel elements controlled to operate parallel through the use of the detected values during test data computation. The thus configured apparatus for inspecting a magnetic disk inspects the characteristics of the magnetic recording medium.

In a method for inspecting a magnetic recording medium, which inspects the magnetic recording medium characteristics in a procedure comprising recording test data onto the magnetic recording medium by a magnetic head, reproducing the recorded test data by the magnetic head, distributing the reproduced test data to N pieces of signals paths, converting the signals into discrete digital values by N pieces of A/D conversion means, and executing appropriate computation with the discrete digital values; a method for inspecting a magnetic disk comprising a step of generating reference signals of a controllable oscillating frequency $f_{in}$ by a first reference signal generating source, a step of selecting and outputting either a reference signal generated by the first reference signal generating source or test data reproduced by the magnetic head, a step of generating timing signals of frequency $f_{ADC}$ which are supplied to the N pieces of A/D conversion means for triggering signal sampling and conversion by a second reference signal generating source 3, wherein the second reference signal generating source controls the frequency $f_{ADC}$ of a timing signal to be supplied to an individual A/D conversion means, and a data manipulation step in which errors occurring in parallel elements controlled to operate parallel of the N pieces of A/D conversion means are detected by computation and the detected values of errors are retained, and subsequent similar errors are compensated with the detected values during test data computation.

In a method for inspecting a magnetic recording medium, which inspects the magnetic recording medium characteristics in a procedure comprising recording test data onto the magnetic recording medium by a magnetic head, reproducing the recorded test data by the magnetic head, distributing the reproduced test data to N pieces of signals paths, converting the signals into discrete digital values by N pieces of A/D conversion means, and executing appropriate computation with the discrete digital values; the method for inspecting a magnetic recording medium comprising a first process for obtaining values for correcting test signal waveforms read from the magnetic recording medium and a second process for correcting the test signal waveforms, using the obtained correction values, wherein, in the first process, through the use of N pieces of A/D conversion means which convert analog reference signals generated with a reference signal generating source into digital values and timing signals which are supplied to the N pieces of A/D conversion means and by which each A/D conversion means determines timing of sampling the reference signals, (1) a correction coefficient of amplitude which is a first correction value is obtained by comparing the amplitude of the reference signals and the amplitude of signals received by each of the N pieces of A/D conversion means and (2) a phase correction value which is a second correction value is obtained by comparing the phase of signals received by a predetermined A/D conversion means and the phase of signals received by another A/D conversion means among the N pieces of A/D conversion means, and, in the second process, at least, amplitude fluctuations and phase shifts of the test signal waveforms are corrected by using the first and second correction values.

In an apparatus for inspecting a magnetic head, which inspects the magnetic head characteristics in a procedure comprising recording test data onto a magnetic recording medium by the magnetic head, reproducing the recorded test data by the magnetic head, distributing the reproduced test data to N pieces of signals paths, converting the signals into discrete digital values by N pieces of A/D conversion means, and executing appropriate computation with the discrete digital values; the apparatus for inspecting a magnetic head comprising a first reference signal generating source which generates reference signals of a controllable oscillating frequency $f_{in}$, a switching means for selecting and outputting either a reference signal generated by the first reference signal generating source or test data reproduced by the magnetic head, a second reference signal generating source which supplies timing signals of frequency $f_{ADC}$ to the N pieces of A/D conversion means for triggering signal sampling and conversion, while controlling the frequency $f_{ADC}$ of a timing signal to be supplied to an individual A/D conversion means, and a data manipulation means in which errors occurring in parallel elements controlled to operate parallel of the N pieces of A/D conversion means are detected by appropriate computation and the detected values of errors are retained, and subsequent similar errors are compensated with the detected values during test data computation.

In an apparatus for inspecting a magnetic head, which inspects the magnetic head characteristics in a procedure comprising recording test data onto a magnetic recording medium by the magnetic head, reproducing the recorded test data by the magnetic head, distributing the reproduced test data to N pieces of signals paths, converting the signals into discrete digital values by N pieces of A/D conversion means, and executing appropriate computation with the discrete digital values; the apparatus for inspecting a magnetic head comprising a first reference signal generating source which generates reference signals of a controllable oscillating frequency $f_{in}$, a first signal switching means for selecting and outputting either a reference signal generated by the first reference signal generating source or test data reproduced by the magnetic head, a second signal generating source which supplies timing signals of frequency $f_{ADC}$ to the N pieces of A/D conversion means for triggering signal sampling and conversion, while controlling the frequency $f_{ADC}$ of a timing signal to be supplied to an individual A/D conversion means, a means for measuring signal transfer characteristics and phase response at the input ports of the N-pieces of A/D conversion means, a second signal switching means for selecting a signal to be measured by the means for measuring signal transfer characteristics and phase response, a means for measuring the waveforms of the timing signals to be supplied to the N pieces of A/D conversion means for triggering signal sampling and conversion to discrete digital values, a means for retaining detected values of errors which have occurred in parallel elements controlled to operate parallel of the N pieces of A/D conversion means and have been detected by the means for measuring signal transfer characteristics and phase response and the means for measuring the waveforms of the timing signals, and a data manipulation means for compensating errors occurring in the parallel elements controlled to operate parallel through the use of the detected values during test data computation. The thus configured apparatus for inspecting a magnetic head inspects the characteristics of the magnetic head.

In a method for inspecting a magnetic head, which inspects the magnetic head characteristics in a procedure comprising recording test data onto a magnetic recording medium by the magnetic head, reproducing the recorded test data by the magnetic head, distributing the reproduced test data to N pieces of signals paths, converting the signals into discrete digital values by N pieces of A/D conversion means, and executing appropriate computation with the discrete digital values; the method for inspecting a magnetic head comprising a step of generating reference signals of a controllable oscillating frequency $f_{in}$ by a first reference signal generating source, a step of selecting and outputting either a reference signal generated by the first reference signal generating source or test data reproduced by the magnetic head, a step of generating timing signals of frequency $f_{ADC}$ which are supplied to the N pieces of A/D conversion means for triggering signal sampling and conversion by a second reference signal generating source, wherein the second reference signal generating source controls the frequency $f_{ADC}$ of a timing signal to be supplied to an individual A/D conversion means, and a data manipulation step in which errors occurring in parallel elements controlled to operate parallel of the N pieces of A/D conversion means are detected by computation and the detected values of errors are retained, and subsequent similar errors are compensated with the detected values during test data computation.

In a method for inspecting a magnetic head, which inspects the magnetic head characteristics in a procedure comprising recording test data onto a magnetic recording medium by the magnetic head, reproducing the recorded test data by the magnetic head, distributing the reproduced test data to N pieces of signals paths, converting the signals into discrete digital values by N pieces of A/D conversion means, and executing appropriate computation with the discrete digital values; the method for inspecting a magnetic head comprising a first process for obtaining values for correcting test signal waveforms read from the magnetic recording medium and a second process for correcting the test signal waveforms, using the obtained correction values, wherein, in the first process, through the use of N pieces of A/D conversion means which convert analog reference signals generated with a reference signal generating source into digital values and timing signals which are supplied to the N pieces of A/D conversion means and by which each A/D conversion means determines timing of sampling the reference signals, (1) a correction coefficient of amplitude which is a first correction value is obtained by comparing the amplitude of the reference signals and the amplitude of signals received by each of the N pieces of A/D conversion means and (2) a phase correction value which is a second correction value is obtained by comparing the phase of signals received by a predetermined A/D conversion means and the phase of signals received by another A/D conversion means among the N pieces of A/D conversion means, and, in the second process, at least, amplitude fluctuations and phase shifts of the test signal waveforms are corrected by using the first and second correction values.

According to the present invention, high precision inspection of a magnetic disk or magnetic head can be carried out by detecting errors regarding offsets and gain differentials among signal distribution paths, phase shifts of sampling clocks supplied to a plurality of A/D converters, and frequency-dependence of the transfer function and phase response of signal paths, correcting the errors with previously measured values of corresponding errors, and thus compensating the errors.

Using the inspection apparatus and method of the present invention, as described hereinbefore, high precision inspection and measurements of characteristics of magnetic disks and magnetic heads can be achieved by detecting and compensating offsets and gain differentials among signal distribution paths, phase shifts of sampling clocks supplied to a plurality of A/D converters, and frequency-dependence of the transfer function and phase response of signal paths.

The invention claimed is:

1. In an apparatus for inspecting a magnetic recording medium, which inspects the magnetic recording medium characteristics in a procedure comprising recording test data onto the magnetic recording medium by a magnetic head, reproducing the recorded test data by the magnetic head, distributing the reproduced test data to N pieces of signals paths, where N is an integer greater than 1, converting the signals into discrete digital values by N pieces of A/D converters, and executing appropriate computation with the discrete digital values; an apparatus for inspecting a magnetic disk comprising a first reference signal generating source which generates reference signals of a controllable oscillating frequency $f_{in}$, a signal switching means for selecting and outputting either a reference signal generated by the first reference signal generating source or test data reproduced by the magnetic head, a second reference signal generating source which supplies timing signals of frequency $f_{ADC}$ to the N pieces of A/D conversion means for triggering signal sampling and conversion, while controlling the frequency $f_{ADC}$ of a timing signal to be supplied to an individual A/D conversion means, and a data manipulation means in which errors occurring in parallel elements controlled to operate parallel of the N pieces of A/D conversion means are detected by appropriate computation and the detected values of errors are retained, and subsequent similar errors are compensated with the detected values during test data computation.

2. An apparatus for inspecting a magnetic disc according to claim 1, wherein said signal switching means includes a lead wire connect/disconnect mechanism.

3. An apparatus for inspecting a magnetic disc according to claim 1, wherein said data manipulation means which compensates errors occurring in the parallel elements controlled to operate parallel of the N pieces of A/D conversion means by appropriate computation, where the errors are at least one of the following types: offset errors of signals passing through the N pieces of distribution paths, gain differentials of signals passing through the N pieces of distribution paths, and phase shifts of timing signals which are supplied to the N pieces of A/D conversion means for parallel control and for triggering signal sampling and conversion to discrete digital values, detects the errors by assigning parameters, the number of discrete digital values data p to be output by each of the N pieces of A/D conversion means within a data range to be computed, the number of reference signal periods m, frequency $f_{in}$ of the reference signals, and frequency $f_{ADC}$ of said timing signals so as to satisfy a relationship expressed by $f_{in}/f_{ADC}=m/p$, where p and m are integers that are mutually prime, and, after the A/D conversion means convert the reference signals into discrete digital values, computing Fast Fourier Transform (FFT) or Discrete Fourier Transform (DFT) of the digital values or inputting a reference signal value of 0 and retaining discrete digital values output by each of the N pieces of A/D conversion means, and corrects subsequent similar errors in sets of discrete digital values output by each of the N pieces of A/D conversion means consistently with the detected values of errors, thereby compensating the errors.

4. An apparatus for inspecting a magnetic disc according to claim 1, wherein said data manipulation means which compensates errors occurring in the parallel elements controlled to operate parallel of the N pieces of A/D conversion means by appropriate computation, where the errors are at least either of the following types: gain differentials of signals passing through the N pieces of distribution paths and phase shifts of timing signals which are supplied to the N pieces of A/D conversion means for parallel control and for triggering signal sampling and conversion to discrete digital values, detects the errors by executing computation in which, using two discrete digital values resulting from conversion of sine wave reference signals by the N pieces of A/D conversion means, a simultaneous equation of the sine wave signals including the errors is evaluated, and corrects subsequent similar errors detected in sets of discrete digital values output by each of the N pieces of A/D conversion means consistently with the computed values of errors, thereby compensating the errors.

5. An apparatus for inspecting a magnetic disc according to claim 1, wherein said data manipulation means which compensates errors occurring in the parallel elements controlled to operate parallel of the N pieces of A/D conversion means by appropriate computation, where the errors are due to frequency-dependence of a signal transfer function, detects the errors by assigning parameters, the number of discrete digital values data p to be output by each of the N pieces of A/D conversion means within a data range to be computed, the number of reference signal periods m, frequency $f_{in}$ of the reference signals, and frequency $f_{ADC}$ of said timing signals so as to satisfy a relationship expressed by $f_{in}/f_{ADC}=m/p$, where p and m are integers that are mutually prime and all frequencies falling within a test frequency range are assigned to $f_{in}$, and, after the A/D conversion means convert the reference signals into discrete digital values, calculating signal amplitude per frequency through computation of Fast Fourier Transform (FFT) or Discrete Fourier Transform (DFT) of the digital values, and compensates frequency-dependence of signal amplitude by calculating signal amplitude per frequency included in discrete digital values of test data through computation of Fast Fourier Transform (FFT) or Discrete Fourier Transform (DFT) of the digital values and correcting the thus obtained signal amplitude profile with the previously detected corresponding error values of the reference signals, thereby compensating the errors.

6. An apparatus for inspecting a magnetic disc according to claim 1, wherein said data manipulation means which compensates errors occurring in the parallel elements controlled to operate parallel of the N pieces of A/D conversion means by appropriate computation, where the errors are due to frequency-dependence of signal phase response, detects the errors by assigning parameters, the number of discrete digital values data p to be output by each of the N pieces of A/D conversion means within a data range to be computed, the number of reference signal periods m, frequency $f_{in}$ of the reference signals, and frequency $f_{ADC}$ of said timing signals so as to satisfy a relationship expressed by $f_{in}/f_{ADC}=m/p$, where p and m are integers that are mutually prime and all frequencies falling within a test frequency range are assigned to $f_{in}$, and, after the A/D conversion means convert the reference signals into discrete digital values, calculating signal phase per frequency through computation of Fast Fourier Transform (FFT) or Discrete Fourier Transform (DFT) of the digital values, and compensates frequency-dependence of phase response by calculating signal phase per frequency included in discrete digital values of test data through computation of Fast Fourier Transform (FFT) or Discrete Fourier Transform (DFT) of the digital values and correcting the thus obtained signal phase profile with the previously detected corresponding error values of the reference signals, thereby compensating the errors, 7. In an apparatus for inspecting a magnetic recording medium, which inspects the magnetic recording medium characteristics in a procedure comprising recording test data onto the magnetic recording medium by a magnetic head, reproducing the recorded test data by the magnetic head, distributing the reproduced test data to N pieces of signals paths, where N is an integer greater than 1, converting the signals into discrete digital values by N pieces of A/D conversion means, and executing appropriate computation with the discrete digital values; an apparatus for inspecting a magnetic disk comprising a first reference signal generating source which generates reference signals of a controllable oscillating frequency $f_{in}$, a first signal switching means for selecting and outputting either a reference signal generated by the first reference signal generating source or test data reproduced by the magnetic head, a second signal generating source which supplies timing signals of frequency $f_{ADC}$ to the N pieces of A/D conversion means for triggering signal sampling and conversion, while controlling the frequency $f_{ADC}$ of a timing signal to be supplied to an individual A/D conversion means, a means for measuring signal transfer characteristics and phase response at the input ports of the N-pieces of A/D conversion means, a second signal switching means for selecting a signal to be measured by the means for measuring signal transfer characteristics and phase response, a means for measuring the waveforms of the timing signals to be supplied to the N pieces of A/D conversion means for triggering signal sampling and conversion to discrete digital values, a means for retaining detected values of errors which have occurred in the parallel elements controlled to operate parallel of the N pieces of A/D conversion means and have been detected by the means for measuring signal transfer characteristics and phase response and the means for measuring the waveforms of the timing signals, and a data manipulation means for compensating errors occurring in the parallel elements controlled to operate parallel through the use of the detected values during test data computation.

8. An apparatus for inspecting a magnetic disk according to claim 7, wherein said first and second signal switching means performs signal path switching by making lead wire connection/disconnection or probe measurement point change.

9. An apparatus for inspecting a magnetic disk according to claim 7, wherein said means for measuring signal transfer characteristics and phase response which detects errors occurring in the parallel elements controlled to operate parallel of the N pieces of A/D conversion means by measuring signal transfer characteristics and phase response at the inputs of the N pieces of A/D conversion means, where the errors are gain differentials among the signals passing through the N pieces of distribution paths and due to the frequency-dependence of transfer function and phase response, forces the first reference signal generating source to output reference signals of all frequencies $f_{in}$ falling within a test frequency range, measures the transfer characteristics and phase response of the reference signals, and detects the errors by comparing the measured values with ideal values, and, using the thus obtained error profile, said data manipulation means corrects similar errors detected in discrete digital values output by the N pieces of A/D conversion means consistently, thereby compensating the errors.

10. An apparatus for inspecting a magnetic disk according to claim 7, wherein said data manipulation means which compensates errors occurring in the parallel elements controlled to operate parallel of the N pieces of A/D conversion means by appropriate computation, where the errors are due to frequency-dependence of a signal transfer function, calculates signal amplitude per frequency included in discrete digital values of test data through computation of Fast Fourier Transform (FFT) or Discrete Fourier Transform (DFT) of the digital values, while said means for measuring signal transfer characteristics and phase response forces the first reference signal generating source to output reference signals of all frequencies $f_{in}$ falling within a test frequency range, measures the transfer characteristics and phase response of the reference signals, and detects the errors by comparing the measured values with ideal values, and, using the thus obtained error profile, said data manipulation means corrects the calculated signal amplitude profile of test data, thereby compensating the errors.

11. An apparatus for inspecting a magnetic disk according to claim 7, wherein said data manipulation means compensates errors occurring in the parallel elements controlled to operate parallel of the N pieces of A/D conversion means by appropriate computation, where the errors are phase shifts of timing signals which are supplied to the N pieces of A/D conversion means for parallel control and for triggering signal sampling and conversion to discrete digital values, while said means for measuring the waveforms of the timing signals detects errors occurring in the parallel elements controlled to operate parallel of the N pieces of A/D conversion means by measuring the waveforms of timing signals to be supplied to the N pieces of A/D conversion means for triggering signal sampling and conversion to discrete digital values, where the errors are the phase shifts of the timing signals which are supplied to the N pieces of A/D conversion means for parallel control and for triggering signal sampling and conversion to discrete digital values, and said means for measuring the waveforms of the timing signals measures said timing signals supplied to the N pieces of A/D conversion means concurrently along the same time axis, calculates how the measured values deviate from an ideal phase differential of the timing signals, and makes a resulting phase shift profile retained by said retaining means, and, using the phase shift profile, said data manipulation means interpolates discrete digital values output by the N pieces of A/D conversion means, thereby compensating the errors.

12. In an apparatus for inspecting a magnetic head, which inspects the magnetic head characteristics in a procedure comprising recording test data onto a magnetic recording medium by the magnetic head, reproducing the recorded test data by the magnetic head, distributing the reproduced test data to N pieces of signals paths, where N is an integer greater than 1, converting the signals into discrete digital values by N pieces of A/D conversion means, and executing appropriate computation with the discrete digital values; the apparatus for inspecting a magnetic head comprising a first reference signal generating source which generates reference signals of a controllable oscillating frequency $f_{in}$, a signal switching means for selecting and outputting either a reference signal generated by the first reference signal generating source or test data reproduced by the magnetic head, a second reference signal generating source which supplies timing signals of frequency $f_{ADC}$ to the N pieces of A/D conversion means for triggering signal sampling and conversion, while controlling the frequency $f_{ADC}$ of a timing signal to be supplied to an individual A/D conversion means, and a data manipulation means in which errors occurring in parallel elements controlled to operate parallel of the N pieces of A/D conversion means are detected by appropriate computation and the detected values of errors are retained, and subsequent similar errors are compensated with the detected values during test data computation.

13. An apparatus for inspecting a magnetic head according to claim 12, wherein said data manipulation means which compensates errors occurring in the parallel elements controlled to operate parallel of the N pieces of A/D conversion means by appropriate computation, where the errors are at least one of the following types: offset errors of signals passing through the N pieces of distribution paths, gain differentials of signals passing through the N pieces of distribution paths, and phase shifts of timing signals which are supplied to the N pieces of A/D conversion means for parallel control and for triggering signal sampling and conversion to discrete digital values, detects the errors by assigning parameters, the number of discrete digital values data p to be output by each of the N pieces of A/D conversion means within a data range to be computed, the number of reference signal periods m, frequency $f_{in}$ of the reference signals, and frequency $f_{ADC}$ of said timing signals so as to satisfy a relationship expressed by $f_{in}/f_{ADC}=m/p$, where p and m are integers that are mutually prime, and, after the A/D conversion means convert the reference signals into discrete digital values, computing Fast Fourier Transform (FFT) or Discrete Fourier Transform (DFT) of the digital values or inputting a reference signal value of 0 and retaining discrete digital values output by each of the N pieces of A/D conversion means, and corrects subsequent similar errors in sets of discrete digital values output by each of the N pieces of A/D conversion means consistently with the detected values of errors, thereby compensating the errors.

14. An apparatus for inspecting a magnetic head according to claim 12, wherein said data manipulation means which compensates errors occurring in the parallel elements controlled to operate parallel of the N pieces of A/D conversion means by appropriate computation, where the errors are at least either of the following types: gain differentials of signals passing through the N pieces of distribution paths and phase shifts of timing signals which are supplied to the N pieces of A/D conversion means for parallel control and for triggering signal sampling and conversion to discrete digital values, detects the errors by executing computation in which, using two discrete digital values resulting from conversion of sine wave reference signals by the N pieces of A/D conversion means, a simultaneous equation of the sine wave signals including the errors is evaluated, and corrects subsequent similar errors detected in sets of discrete digital values output by each of the N pieces of A/D conversion means consistently with the computed values of errors, thereby compensating the errors.

15. An apparatus for inspecting a magnetic head according to claim 12, wherein said data manipulation means which compensates errors occurring in the parallel elements controlled to operate parallel of the N pieces of ND conversion means by appropriate computation, where the errors are due to frequency-dependence of a signal transfer function, detects the errors by assigning parameters, the number of discrete digital values data p to be output by each of the N pieces of A/D conversion means within a data range to be computed, the number of reference signal periods m, frequency $f_{in}$ of the reference signals, and frequency $f_{ADC}$ of said timing signals so as to satisfy a relationship expressed by $f_{in}/f_{ADC}=m/p$, where p and m are integers that are mutually prime and all frequencies falling within a test frequency range are assigned to $f_{in}$, and, after the A/D conversion means convert the reference signals into discrete digital values, calculating signal amplitude per frequency through computation of Fast Fourier Transform (FFT) or Discrete Fourier Transform (DFT) of the digital values, and compensates frequency-dependence of signal amplitude by calculating signal amplitude per frequency included in discrete digital values of test data through computation of Fast Fourier Transform (FFT) or Discrete Fourier Transform (DFT) of the digital values and correcting the thus obtained signal amplitude profile with the previously detected corresponding error values of the reference signals, thereby compensating the errors.

16. An apparatus for inspecting a magnetic disc head to claim 12, wherein said data manipulation means which compensates errors occurring in the parallel elements controlled to operate parallel of the N pieces of A/D conversion means by appropriate computation, where the errors are due to frequency-dependence of signal phase response, detects the errors by assigning parameters, the number of discrete digital values data p to be output by each of the N pieces of A/D conversion means within a data range to be computed, the number of reference signal periods m, frequency $f_{in}$ of the reference signals, and frequency $f_{ADC}$ of said timing signals so as to satisfy a relationship expressed by $f_{in}/f_{ADC}=m/p$, where p and m are integers that are mutually prime and all frequencies falling within a test frequency range are assigned to $f_{in}$, and, after the A/D conversion means convert the reference signals into discrete digital values, calculating signal phase per frequency through computation of Fast Fourier Transform (FFT) or Discrete Fourier Transform (DFT) of the digital values, and compensates frequency-dependence of phase response by calculating signal phase per frequency included in discrete digital values of test data through computation of Fast Fourier Transform (FFT) or Discrete Fourier Transform (DFT) of the digital values and correcting the thus obtained signal phase profile with the previously detected corresponding error values of the reference signals, thereby compensating the errors.

17. In an apparatus for inspecting a magnetic head, which inspects the magnetic head characteristics in a procedure comprising recording test data onto a magnetic recording medium by the magnetic head, reproducing the recorded test data by the magnetic head, distributing the reproduced test data to N pieces of signals paths, where N is an integer greater than 1, converting the signals into discrete digital values by N pieces of A/D conversion means, and executing appropriate computation with the discrete digital values; the apparatus for inspecting a magnetic disk comprising a first reference signal generating source which generates reference signals of a controllable oscillating frequency $f_{in}$, a first signal switching means for selecting and outputting either a reference signal generated by the first reference signal generating source or test data reproduced by the magnetic head, a second signal generating source which supplies timing signals of frequency $f_{ADC}$ to the N pieces of A/D conversion means for triggering signal sampling and conversion, while controlling the frequency $f_{ADC}$ of a timing signal to be supplied to an individual A/D conversion means, a means for measuring signal transfer characteristics and phase response at the input ports of the N-pieces of A/D conversion means, a second signal switching means for selecting a signal to be measured by the means for measuring signal transfer characteristics and phase response, a means for measuring the waveforms of the timing signals to be supplied to the N pieces of A/D conversion means for triggering signal sampling and conversion to discrete digital values, a means for retaining detected values of errors which have occurred in the parallel elements controlled to operate parallel of the N pieces of A/D conversion means and have been detected by the means for measuring signal transfer characteristics and phase response and the means for measuring the waveforms of the timing signals, and a data manipulation means for compensating errors occurring in the parallel elements controlled to operate parallel through the use of the detected values during test data computation.

18. An apparatus for inspecting a magnetic head according to claim 17, wherein said means for measuring signal transfer characteristics and phase response which detects errors occurring in the parallel elements controlled to operate parallel of the N pieces of A/D conversion means by measuring signal transfer characteristics and phase response at the inputs of the N pieces of A/D conversion means, where the errors are gain differentials among the signals passing through the N pieces of distribution paths and due to the frequency-dependence of transfer function and phase response, forces the first reference signal generating source to output reference signals of all frequencies $f_{in}$ falling within a test frequency range, measures the transfer characteristics and phase response of the reference signals, and detects the errors by comparing the measured values with ideal values, and, using the thus obtained error profile, said data manipulation means corrects similar errors detected in discrete digital values output by the N pieces of A/D conversion means consistently, thereby compensating the errors.

19. An apparatus for inspecting a magnetic head according to claim 17, wherein said data manipulation means which compensates errors occurring in the parallel elements controlled to operate parallel of the N pieces of A/D conversion means by appropriate computation, where the errors are due to frequency-dependence of a signal transfer function, calculates signal amplitude per frequency included in discrete digital values of test data through computation of Fast Fourier Transform (FFT) or Discrete Fourier Transform (DFT) of the digital values, while said means for measuring signal transfer characteristics and phase response forces the first reference signal generating source to output reference signals of all frequencies $f_{in}$ falling within a test frequency range, measures the transfer characteristics and phase response of the reference signals, and detects the errors by comparing the measured values with ideal values, and, using the thus obtained error profile, said data manipulation means corrects the calculated signal amplitude profile of test data, thereby compensating the errors.

20. An apparatus for inspecting a magnetic head according to claim 17, wherein said data manipulation means compensates errors occurring in the parallel elements controlled to operate parallel of the N pieces of A/D conversion means by appropriate computation, where the errors are phase shifts of timing signals which are supplied to the N pieces of A/D conversion means for parallel control and for triggering signal sampling and conversion to discrete digital values, while said means for measuring the waveforms of the timing signals detects errors occurring in the parallel elements controlled to operate parallel of the N pieces of A/D conversion means by measuring the waveforms of timing signals to be supplied to the N pieces of A/D conversion means for triggering signal sampling and conversion to discrete digital values, where the errors are the phase shifts of the timing signals which are supplied to the N pieces of A/D conversion means for parallel control and for triggering signal sampling and conversion to discrete digital values, and said means for measuring the waveforms of the timing signals measures said timing signals supplied to the N pieces of A/D conversion means concurrently along the same time axis, calculates how the measured values deviate from an ideal phase differential of the timing signals, and makes a resulting phase shift profile retained by said retaining means, and, using the phase shift profile, said data manipulation means interpolates discrete digital values output by the N pieces of A/D conversion means, thereby compensating the errors.

* * * * *

UNITED STATES PATENT AND TRADEMARK OFFICE
CERTIFICATE OF CORRECTION

PATENT NO. : 7,817,362 B2  
APPLICATION NO. : 10/347387  
DATED : October 19, 2010  
INVENTOR(S) : Takahashi et al.

It is certified that error appears in the above-identified patent and that said Letters Patent is hereby corrected as shown below:

Title page,

Item (73) Assignee, should read as follows:

Hitachi, Ltd., Tokyo (JP)

Signed and Sealed this  
Third Day of May, 2011

David J. Kappos  
*Director of the United States Patent and Trademark Office*